United States Patent [19]

Heinzl et al.

[11] 4,412,256
[45] Oct. 25, 1983

[54] METHOD AND APPARATUS FOR THE REPRESENTATION OF GRAY SCALE VALUES IN FACSIMILE TRANSMISSION

[75] Inventors: Joachim Heinzl, Munich; Klaus P. von Borstel, Pullach, both of Fed. Rep. of Germany

[73] Assignee: Siemens Aktiengesellschaft, Berlin & Munich, Fed. Rep. of Germany

[21] Appl. No.: 281,868

[22] Filed: Jul. 9, 1981

[30] Foreign Application Priority Data

Aug. 13, 1980 [DE] Fed. Rep. of Germany ....... 3030648

[51] Int. Cl.³ .............................................. H04M 1/40
[52] U.S. Cl. .................................... 358/283; 358/284; 358/298
[58] Field of Search ............... 358/283, 280, 284, 298, 358/296

[56] References Cited
U.S. PATENT DOCUMENTS
3,965,290 7/1976 Tisue ..................................... 178/6

Primary Examiner—Robert L. Griffin
Assistant Examiner—Edward L. Coles
Attorney, Agent, or Firm—Hill, Van Santen, Steadman & Simpson

[57] ABSTRACT

A method and apparatus for representing gray scale values in facsimile transmission wherein the gray scale values are produced by a number of dots of equal size per unit area on a recording medium prints the dots in consecutive lines which are displaced by constant distances in order to avoid the generation of dashes running perpendicular to the advancing direction of the printing head. The displacement of the consecutive lines is achieved by the addition of different size constant values to the sums of instantaneous values of the gray scale value signals which correspond to the printed gray scale values. The sums corresponding to different lines thus attain a threshold value at different points in time and a dot is printed upon each attainment of the threshold value. The sums are simultaneously decreased by the threshold value. Whenever a black gray scale value occurs, the sum is completely erased.

12 Claims, 5 Drawing Figures

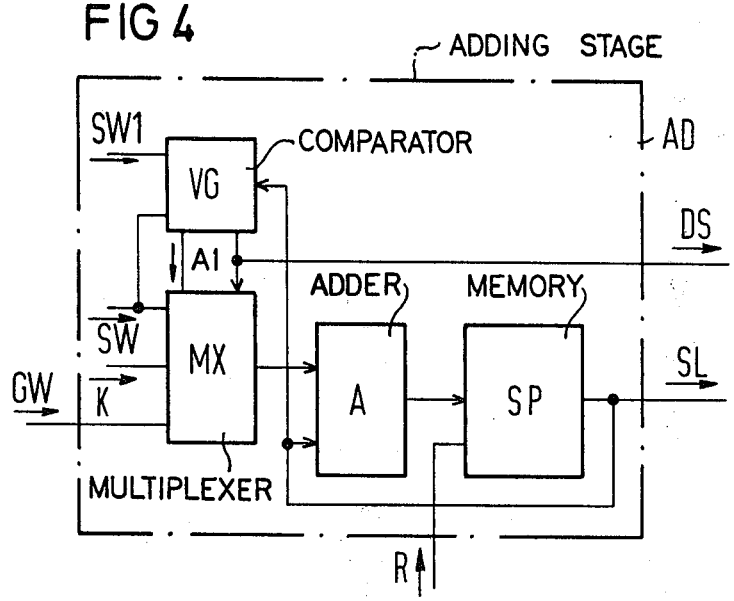
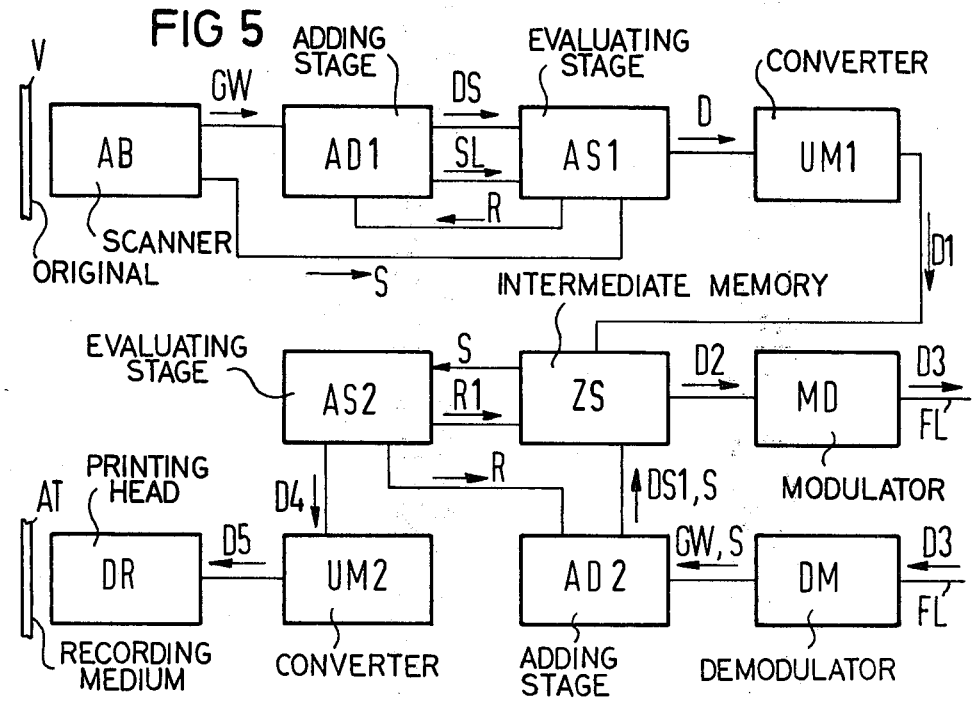

METHOD AND APPARATUS FOR THE REPRESENTATION OF GRAY SCALE VALUES IN FACSIMILE TRANSMISSION

BACKGROUND OF THE INVENTION

The present invention relates to a method and apparatus for representing gray scale values in facsimile transmission of material for printing on a recording medium, and specifically relates to such a method wherein an original having graphic patterns thereon is scanned along several parallel lines and gray scale value signals associated with the gray scale values of the graphic pattern are generated, which gray scale values are represented by means of individual dots of equal size and the number of such dots per unit area corresponds to each gray scale value.

It is known to employ writing stations provided with a mosaic printing head not only for representing alphanumeric characters but also for receiving information as part of a facsimile transmission. The characters and the graphic pattern in such writing stations are represented by means of dots of equal size which are generated by the mosaic printing head. Because generation dots with varied sizes is not possible in the case of most mosaic printing heads, gray scale values must be displayed on a recording medium as pseudo half tones comprised of dots of the same size. In order to achieve a number of such pseudo half tones, a specific number of dots per unit area is associated with each gray scale value.

It is possible to generate such pseudo half tones by providing an adder stage which sums instantaneous values of gray scale value signals which are generated during a scanning of an original along one line. When the sum exceeds a predetermined threshold value, a print command may be released to the mosaic printing head. The sum is simultaneously decreased by the threshold value. If a uniformly gray area is scanned on a plurality of lines, there is the possibility that, in the case of equal initial values, the sums associated with all lines will simultaneously reach the threshold value and the uniformly gray area will thus be depicted by means of dashes which are perpendicular to the scanned lines. Such vertical dashes can result in moire patterns and moreover, in such a representation, it cannot be determined whether a uniformly gray area on the original or an area on the original having vertical dashes was scanned.

SUMMARY OF THE INVENTION

It is an object of the present invention to provide a method and apparatus for representing gray scale values whereby uniformly gray areas are unambiguously represented by means of corresponding pseudo half tones.

The above object is inventively achieved in a method and apparatus which employ the following steps. The instantaneous values of the gray scale value signals for a predetermined number of lines are added and stored in a memory. If the stored sums associated with the first lines are equal, different constant values are added to each sum. When a sum exceeds a predetermined threshold value, a dot is printed on the corresponding line on a recording medium at a receiving station. After the printing of a dot, the sum is decreased by a value corresponding to a black value of the gray scale.

The above method and apparatus for practicing the method have the advantage that the development of moire patterns is avoided when uniformly gray areas are reproduced. The method and apparatus require a lower circuit outlay than conventional devices if the gray scale values are depicted after digitalization of the gray scale value signals and if the addition of the gray scale value signals and the constant values, as well as the subtraction of a value corresponding to a black value, are undertaken digitally.

In a preferred embodiment of the invention, the constant value in each case is added when the corresponding line sum reaches one half of the value associated with the black value on the gray scale.

By means of the addition of the constant values, a gray scale value increment is avoided when the sum of the values added to the individual sums is made as small as possible, in the case of a predetermined number of lines. Such minimization is attained by the use of positive and negative values as the values which are added to the sums associated with the different lines. A gray scale value increment is completely avoided when the sum of the constant values is equal to zero.

The threshold value is preferably equal to the value associated with the black value of the gray scale and is equal to a predetermined integral multiple of the black value for a partial step. A partial step is for purposes of this disclosure defined as the smallest difference between two possible dot positions along a line. Also for purposes of this disclosure, a step is defined as the shortest spacing between two dots generated by the same writing element.

In order to avoid scattering of dots as a result of the summing of edge gray scale values at sharp contours in the graphic pattern, it is preferable that the sums take a zero value upon each occurrence of a signal value corresponding to a black gray scale value.

An apparatus for realizing the inventive method disclosed herein has an adding stage which is connected with an evaluating stage. The adding stage sums the gray scale value signals, adds the constant values when the evaluating stage identifies an equality of sums associated with different lines, and subtracts the value associated with a black gray scale value when a specific sum attains the threshold value.

The inventive method disclosed herein can be employed both on the transmitting side and on the receiving side of a data transmission system when the adding stage is post-connected to a scanner which scans the graphic pattern and/or a demodulator which demodulates received signals.

DESCRIPTION OF THE DRAWINGS

FIG. 4 is a block diagram of an adding stage for use in an apparatus constructed in accordance with the principles of the present invention.

FIG. 5 is a block diagram of an apparatus constructed in accordance with the principles of the present invention for facsimile transmission.

DESCRIPTION OF THE PREFERRED EMBODIMENTS

Figure 1:
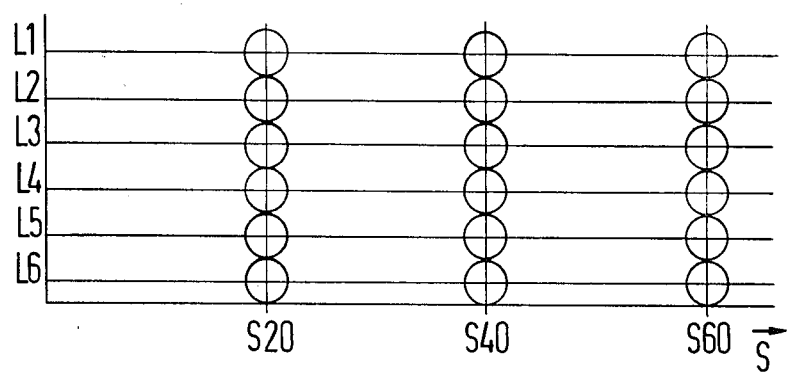
FIG. 1 is a graphical representation of an unacceptable representation of uniformly gray areas.

An example of an unacceptable means of representing uniformly gray areas in the case of facsimile transmission by printing of a number of dots of equal size is shown in FIG. 1. It is assumed that representation of the gray scale values proceeds simultaneously in lines L1 through L6. Corresponding gray scale value signals are, for example, generated by means of a scanner which simultaneously scans an original on six corresponding lines. The gray scale value signals are then fed to an adding stage which sums the instantaneous values of the gray scale value signals for each line. When the sum associated with each line reaches or exceeds a predetermined threshold value, a printing command is released to a mosaic printing head which generates dots of equal size.

When a uniformly gray area is scanned, and in the summation for each line L1 through L6, the same initial value is present, the sum in the case of each line L1 through L6 reaches the threshold value at the same time so that, as shown in FIG. 1, a dot is simultaneously printed in each of lines L1 through L6 at a location such as, for example, S20. After the printing of such a dot, the corresponding sum is either erased or is decreased by a constant value which corresponds to a black value of the gray scale. At locations such as S40 and S60, the sums again reach the threshold value. Such a manner of reproduction therefore results in uniformly gray areas which are represented at the receiving side of the system by a series of vertical dashes comprised of the individual dots. Such a representation not only has a disturbing effect on the observer and results in the development of moire patterns, but also presents a pattern at the receiving side from which an observer cannot determine whether a uniformly gray area was present on the original or whether corresponding vertical dashes were present on the original, because both types of graphic patterns on the original will result in the same received pattern as shown in FIG. 1.

Figure 2:
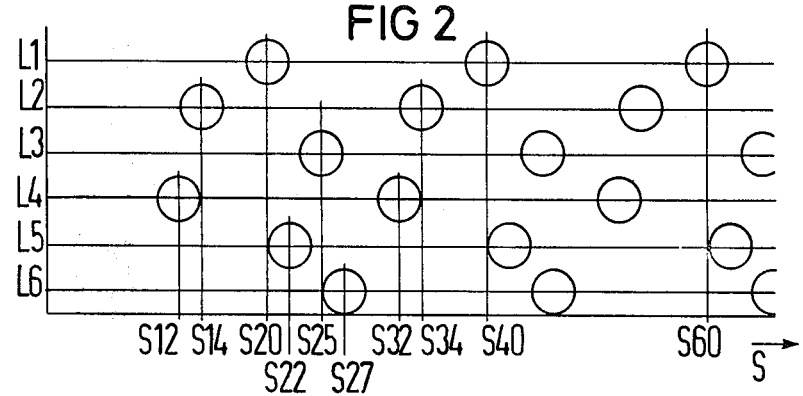
FIG. 2 is a graphical representation of uniformly gray areas which arises by means of the inventive method and apparatus disclosed herein.

A depiction on a recording medium of a uniformly gray area occurring on an original generated in accordance with the principles of the present invention is shown in FIG. 2. Again, it is assumed that a uniformly gray area on the original is scanned simultaneously in six lines and is depicted by means of a printing head containing printing elements associated with each of lines L1 through L6. In order to avoid formation of vertical dashes in the representation of the scanned uniformly gray area, different constant values have been added to the sums associated with each line L1 through L6. The sum for the line L1 remains unchanged so that the dots on this line are printed at locations S20, S40 and S60 which correspond to the locations S20, S40 and S60 in FIG. 1. The constant value associated to line L1 thus amounts to zero. A value such as, for example, $\frac{1}{3}$, is added to the sum associated with the line L2, so that this sum attains the theshold value earlier, namely at location S14, and a print command is released to the corresponding printing element at this location. Following this, the sum is decreased in a manner similar to the representation of the dots on the line L1 by a value associated with the black value for the gray scale. At a location S32, the threshold value S is reached again and another dot is printed on line L2. In a similar manner a value such as, for example, $\frac{1}{4}$, is subtracted from the sum associated with the line L3, so that at a point in time S25 the threshold value S is attained on line L3 and a print command is released to the printing head. Constant values such as, for example, 5/12, $-\frac{1}{2}$, and $-\frac{1}{3}$ are respectively added to the sums associated with the remaining lines L4 through L6.

The values added are chosen such that their sum is as small as possible, and is zero in the ideal case, in order to minimize a changing of the gray scale value. In the example presented above, a total sum of 1/12 results. The individual constant values are selected in order to achieve as uniform a distribution of the dots as possible in order to avoid the development of vertical, diagonal or horizontal lines. The following table presents examples for constant values which are to be added to the $j^{th}$ printing element for k simultaneously activateable printing elements.

| j/k | 2 | 3 | 4 | 5 | 6 | 7 | 8 |
|---|---|---|---|---|---|---|---|
| 1 | 0 | 0 | $\frac{1}{8}$ | 0 | 0 | 0 | 0 |
| 2 | $\frac{1}{4}$ | $\frac{1}{6}$ | $-\frac{1}{8}$ | 2/5 | $\frac{1}{4}$ | 5/14 | $\frac{3}{8}$ |
| 3 |  | $-1/6$ | $\frac{3}{8}$ | $-2/5$ | $-\frac{1}{4}$ | $-1/7$ | $-\frac{1}{8}$ |
| 4 |  |  | $-\frac{1}{4}$ | 3/10 | 5/12 | 1/7 | $\frac{1}{8}$ |
| 5 |  |  |  | $-1/5$ | $-1/12$ | $-5/14$ | $-\frac{3}{8}$ |
| 6 |  |  |  |  | $-\frac{1}{3}$ | $-3/14$ | $\frac{1}{4}$ |
| 7 |  |  |  |  |  | 2/7 | $-7/16$ |
| 8 |  |  |  |  |  |  | 3/16 |

As can be seen from the above table the sum of the constant values for eight printing elements is equal to zero, while in all other cases the sum is equal to $\frac{1}{2}k$.

Figure 3:
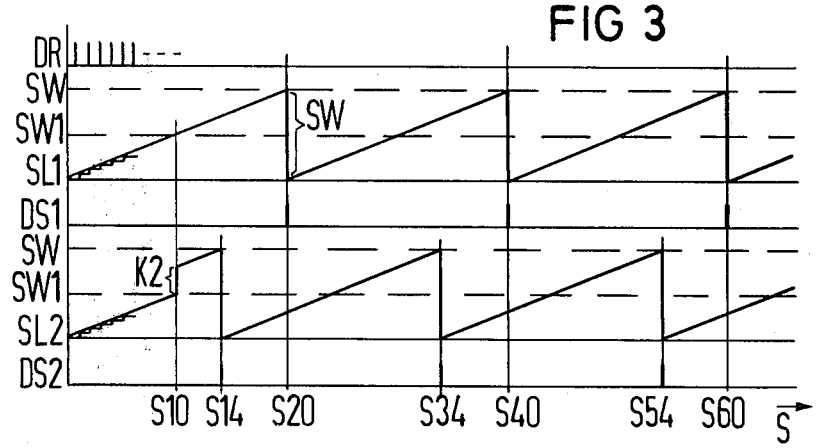
FIG. 3 is a graphical representation of various signals for generating different dots according to the principles of the present invention.

A graphical representation of signal values employed in the inventive method and apparatus is shown in FIG. 3 wherein a distance S is shown on the horizontal axis and the instantaneous values of the signals is shown on the vertical axis. The signals on the vertical axis are such as would occur upon the reproduction of a uniformly gray area. The signals DR are associated with the individual printing positions. The interval between two signals DR corresponds to a partial step, and if the representation takes place in quarter steps, in each case four signals DR form a step. The sums of the gray scale value signals in the individual lines are shown in analog form for simplicity. The sum SL1 represents the sum of the gray scale value signals for the line L1. Upon the occurrence of each signal DR, occurring by means of a scanning operation of the original, a gray scale value signal is generated which is supplied to an adding stage. The individual instantaneous values of the gray scale value signals are added and at the location S20 the sum reaches a threshold value SW, which is associated with a black value on the gray scale. A printing signal DS1 is thus generated which results in the printing of a dot in the line L1 at the location S20. After the printing of the dot, the sum is decreased by an amount corresponding to the threshold value SW. At the further locations S40 and S60, the threshold value is again attained so that printing signals DS1 are again generated which result in the printing of further dots on line L1.

The sum SL2 associated with the line L2 exceeds a threshold value SW1, which is equal to half of the threshold value SW, at the location S10. At the same location, the sum SL1 exceeds the threshold value SW1 and it is assumed that the sums associated with the lines L3 through L6 also exceed the threshold value SW1 at this location and thus characterize a uniformly gray area. The sum SL2 at this location has the constant value $K2=\frac{1}{3}$ added to it in order to attain a mutual displacement of the dots along the lines. At the location S14, the sum SL2 reaches the threshold value SW, and a printing signal DS2 is generated which brings about the printing of a dot on the line L2 at the location S14. Following this, the sum is again reduced by the black value SW. At the location S24, the sum SL2 again exceeds the threshold value SW1. Because, however, the sum SL1 is different from the sum SL2 at this location, no constant value K2 is added, so that the sum SL2 only reaches the threshold value SW at the location S34. At the location S34, therefore, a dot is again printed on the line L2. In a corresponding manner, a dot is again printed at the location S54. The sums SL3 through SL6, respectively associated with the lines L3 through L6, have corresponding positive or negative constant values K3 through K6 added to the sums, which constant values are obtained from the above table.

An embodiment of an exemplary adding stage AD which undertakes the addition of the instantaneous values of the gray scale value signals is shown in FIG. 4. The gray scale value signals GW generated by a scanner in a known manner are fed via a multiplexer MX to an adder A. A memory SP is post-connected to the adder A, which stores the sum SL for each line of the gray scale values for that line. The adding stage AD contains a comparator VG, which compares the sum SL with the threshold values SW1 and SW. When the sum SL exceeds the threshold value SW1, the comparator VG releases a signal A1 to the multiplexer MX, whereupon the constant value K is through-connected to the adder A, to the extent that the comparators VG of the other lines release signals A1 at the same time. The constant values K may be obtained from any suitable source such as a read only memory or a conventional random generator which generates the constant values according to a random distribution. When the sum SL exceeds the threshold value SW, the comparator VG releases a printing signal DS, which is supplied to an evaluating stage as well as to the multiplexer MX, whereupon the compliment of the threshold value SW is through-connected to the adder A in order to subtract the threshold value SW from the sum SL.

When the scanning device recognizes a black value, the memory SP is erased by a signal R in order to prevent scattering of dots which are generated as a result of the summing of the edge gray scale values of sharp contours in the graphic pattern.

A complete system for undertaking the inventive method disclosed herein is shown in FIG. 5. The system has a scanner AB for scanning an original V along several parallel lines simultaneously. The number of the simultaneously scanned lines is, for example, equal to the number of printing elements provided on a corresponding printing device DR at a receiving station by means of which printing elements dots are printed on a recording medium AT. The scanner AB supplies gray scale value signals for each scanning element to an adding stage AD1, which may be constructed corresponding to the embodiment shown in FIG. 4. For each scanning element, an associated adder A and an associated memory SP may be provided which, for example, may be components of a microprocessor. It is also possible to provide a single adder A which adds the gray scale values GW of all scanning elements corresponding to a time division multiplexing method. Such time division multiplexing methods are known to those skilled in the art. The gray scale value signals GW are preferably in the form of digital signals. In order to generate such digital signals, an analog/digital transformer is provided in the scanner AB. The adding stage AD1 adds the gray scale value signals GW for each line separately. Upon the exceeding of the threshold value SW, the adding stage AD1 releases a printing signal DS to the evaluating stage AS1 and decreases the memory content by the threshold value SW. The evaluating stage AS1, which is post-connected to the adding stage AD1, checks whether the sums associated with the individual lines are increasing uniformly. Such an evaluation stage is described, for example, in U.S. Pat. No. 4,004,079. If the sums are increasing uniformly, the constant values K are released to the adding stage AD1 and are added to the sums SL for each line when the sums exceed half of the threshold value SW, that is when the sums attain the value SW1. When the scanner AB recognizes a black value, the scanner releases a black signal S to the evaluating stage AS1 and the evaluating stage AS1 in turn releases a print command at the suitable time. The memory SP in the adding stage AD1 is simultaneously reset by the signal R released by the evaluating stage AS1.

The evaluating stage AS1 releases the printing signals D which are associated with the signals S or DS to a converter UM1 which converts the signals corresponding to the signals DR in FIG. 3 into step signals. A converter of this type is generally known in the art and may be of the type disclosed, for example, in U.S. Pat. No. 4,204,090. The converter UM1 generates corresponding printing signals D1 and releases those signals to an intermediate memory ZS. In the intermediate memory ZS, the printing signals of all simultaneously scanned lines are stored in parallel. The stored signals are read out serially and are fed as printing signals D2 to a modulator MD. The modulator MD converts the printing signals D2 into modulated printing signals D3 and releases them to a long distance line FL. The printing signals D3 are such that the signals can be received by known devices operating according to CCITT Recommendations, Group 2.

On the receiving side, the signals D3 proceed via the long distance line FL to a demodulator DM which generates and releases gray scale value signals GW and black value signals S to an adding stage AD2 corresponding to the adding stage AD1. The black values S and the printing signals DS1 which arise as a result of the summation are stored serially in the intermediate memory ZS. The signals are subsequently released to a second evaluating stage AS2 which corresponds to the evaluating stage AS1. Upon the appearance of black values S, the memory in the adding stage AD2 is erased. The black values S which were generated as a result of gray scale value addition are identified as such in the intermediate memory ZS so that those values can be recognized by the evaluating stage AS2 as scattering dots and be erased in the intermediate memory when genuine black values S are received for the next printing element in the same or in a neighboring position. Such identification requires no additional memory locations because the identification can proceed at the locations provided for the next printing element of the same position. The identification in the intermediate memory ZS additionally permits the evaluating stage AS2 to identify uniform gray scale values and to displace the black values S which are located in the intermediate memory ZS in such a manner that no vertical dashes arise. Moreover, in order to avoid scattering dots, the adding stage AD2 is erased by a signal R released by the evaluating stage AS2 when, for a printing element, genuine black values S are stored in the intermediate memory ZS in the same or neighboring position as the gray scale values just received. The evaluating stage AS2 further checks whether the black values S are valid coded print commands. For example, if representation on the recording medium AT takes place in a quarter step grid, the spacing of two points corresponds to the spacing of four signals DR of the type shown in FIG. 3. The printing signals are released as signals D4 to a converter UM2 which decodes the printing signals D4 and releases the decoded signals as printing signals D5 to the printing head DR.

The adding stage AD2 is necessary only when the signals D3 which are transmitted represent gray scale value signals. If, on the transmitting side, as shown in FIG. 5, the gray scale values are already converted in pseudo half tones and only black values are still transmitted, these signals can be fed directly into the intermediate memory ZS as signals S.

Although modifications and changes may be suggested by those skilled in the art it is the intention of the inventors to embody within the patent warranted hereon all changes and modifications as reasonably and properly come within the scope of their contribution to the art.

We claim as our invention:

1. A method for representing gray scale values in facsimile transmission wherein said gray scale values are represented on a recording medium by a plurality of printed dots of equal size, the number of said dots per unit area of recording medium being associated with a specific gray scale value, said method comprising the steps of:
   scanning an original having graphic patterns thereon along a plurality of parallel lines;
   generating a plurality of instantaneous gray scale value signals corresponding to gray scale values of the scanned graphic pattern;
   adding said instantaneous gray scale values for each of a pre-determined number of scanned lines to arrive at a sum for each line;
   storing said sums for each line;
   adding a different constant value to said stored sums if said stored sums associated with each line are equal;
   printing a dot on said recording medium for a particular line when the sum associated with said particular line reaches a pre-determined threshold value; and
   decreasing the sum for said particular line after printing said dot by an amount corresponding to a black value of said gray scale.

2. The method of claim 1 further comprising the step of converting said gray scale value signals into digital signals, and wherein the steps of adding said instantaneous gray scale value signals, adding said different constant values, and decreasing said sum for said particular line all are undertaken digitally.

3. The method of claim 1 wherein the step of adding said different constant values to said sums is further defined by adding said different constant values to the sums when a sum for a line reaches half of said threshold value.

4. The method of claim 1 wherein the sum of the different constant values added to the sums of the instantaneous gray scale value signals is minimized for a pre-determined number of lines.

5. The method of claim 1 wherein the sum of the different constant values added to the sums of the instantaneous gray scale value signals is equal to zero for a pre-determined number of lines.

6. The method of claim 1 wherein said threshold valve is equal to said black value.

7. The method of claim 1 wherein a partial step is defined as the smallest difference between two possible dot positions along a line to be printed on said recording medium and wherein said threshold value is equal to a pre-determined integral multiple of said black value for a partial step.

8. The method of claim 1 wherein said sums of said instantaneous gray scale value signals are reset to zero upon the occurrence of a scanned gray scale value which corresponds to said black value.

9. An apparatus for representing gray scale values in facsimile transmission comprising:
   a means for scanning an original having graphic patterns thereon and generating a plurality of gray scale value signals associated with the gray scale value of said graphic pattern;
   an adding stage post-connected to said scanner for summing gray scale value signals for each scanned line;
   an evaluating stage post-connected to said adding stage, said evaluating stage releasing a signal to said adding stage for adding different constant values to the gray scale value signal sums in said adding stage when said sums of different lines are equal,
   said adder subtracting a value associated a black value of said gray scale when a sum for a line reaches a pre-determined threshold value,
   said evaluating stage releasing a printing signal upon attainment of said threshold for a particular line; and
   a receiving means for receiving said printing signal, said receiving means including a printing head for generating a facsimile of said graphic pattern on a recording medium.

10. The apparatus of claim 9 wherein said printing signal is modulated before transmission to said receiving means and wherein said receiving means includes a demodulator for demodulating said modulated printing signal, said receiving means further comprising:
   a receiving means adding stage post-connected to said demodulator for receiving signals from said demodulator and adding said signals to arrive at a sum for each scanned line;
   a receiving means evaluating stage post-connected to said adding stage, said receiving means evaluating stage releasing a signal to said receiving means adding stage for adding different constant values to different scanned lines when said sums for said different scanned lines are equal,
   said receiving means adding stage subtracting a value from a sum for a scanned line when said sum reaches said threshold value,
   said receiving means evaluating stage releasing a printing signal to said printing head upon attainment of said threshold value.

11. The apparatus of claim 10 wherein said receiving means evaluating stage releases a signal to said receiving means adding stage for resetting a sum for a particular line in said receiving means adding stage to zero when said signal for a particular line from said demodulator is a value corresponding to a black value of said gray scale.

12. The apparatus of claim 9 wherein said evaluating stage releases a signal to said adding stage for resetting a sum for a particular line in said adding stage to zero when said scanning means generates a signal having a value corresponding to a black value on said gray scale.

* * * * *